United States Patent
Knisel

(10) Patent No.: US 8,695,297 B2
(45) Date of Patent: Apr. 15, 2014

(54) FOUNDATION FOR A WIND TURBINE TOWER

(75) Inventor: Stefano Knisel, Bergamo (IT)

(73) Assignees: Stefano Kniesel, Bergamo (IT); Artepref, S.A.U., Aranda de Duero, Burgos (ES)

( * ) Notice: Subject to any disclaimer, the term of this patent is extended or adjusted under 35 U.S.C. 154(b) by 0 days.

(21) Appl. No.: 13/394,121

(22) PCT Filed: Sep. 2, 2010

(86) PCT No.: PCT/IB2010/002200
§ 371 (c)(1),
(2), (4) Date: Mar. 2, 2012

(87) PCT Pub. No.: WO2011/030199
PCT Pub. Date: Mar. 17, 2011

(65) Prior Publication Data
US 2012/0167499 A1    Jul. 5, 2012

(30) Foreign Application Priority Data
Sep. 11, 2009   (IT) ............................. MI2009A1559

(51) Int. Cl.
*E02D 27/00*   (2006.01)

(52) U.S. Cl.
USPC ............................. 52/294; 52/745.2; 52/223.2

(58) Field of Classification Search
USPC .............. 52/169.9, 169.13, 294, 296, 745.17, 52/745.18, 741.15, 600–602, 223.2, 223.3, 52/223.7, 223.9
See application file for complete search history.

(56) References Cited

U.S. PATENT DOCUMENTS

| 4,045,929 | A | * | 9/1977 | Velo Dalbrenta ............ 52/223.2 |
| 5,066,167 | A | * | 11/1991 | Siegfried et al. ........... 405/150.1 |
| 5,586,417 | A | * | 12/1996 | Henderson et al. ............. 52/295 |
| 5,590,497 | A | * | 1/1997 | Moore .......................... 52/223.3 |
| 5,826,387 | A | * | 10/1998 | Henderson et al. ............. 52/295 |
| 2007/0181767 | A1 | * | 8/2007 | Wobben .................... 248/346.01 |
| 2008/0072511 | A1 | * | 3/2008 | Phuly .............................. 52/294 |
| 2010/0154318 | A1 | * | 6/2010 | Shockley et al. .................. 52/82 |
| 2011/0061321 | A1 | * | 3/2011 | Phuly .............................. 52/297 |
| 2012/0047830 | A1 | * | 3/2012 | Phuly .............................. 52/294 |

FOREIGN PATENT DOCUMENTS

| EP | 1262614 | 12/2002 |
| JP | 2000283019 | 10/2000 |
| WO | 2005012651 | 2/2005 |
| WO | 2008036934 | 3/2008 |

* cited by examiner

*Primary Examiner* — Brian Glessner
*Assistant Examiner* — Beth Stephan
(74) *Attorney, Agent, or Firm* — Themis Law

(57) ABSTRACT

A foundation for a wind turbine tower, provided with a central accommodation for accommodating and firmly constraining, by means of threaded bars projecting from such central accommodation, an actual wind turbine tower, made of steel or concrete, is entirely prefabricated and includes at least two prefabricated structural elements, modular and monolithic, made of reinforced concrete, approached in sequence, shape-coupled, and subsequently constrained to each other, at least at such central accommodation, by a series of post-tension cables arranged in respective through-holes, so as to make the entire foundation monolithic.

14 Claims, 9 Drawing Sheets

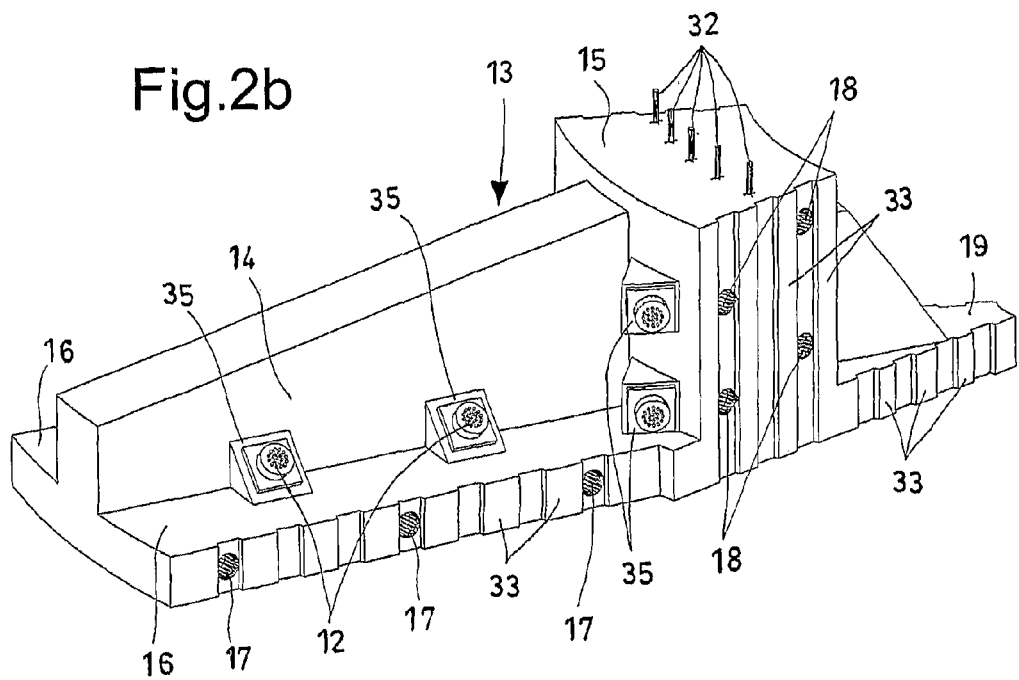
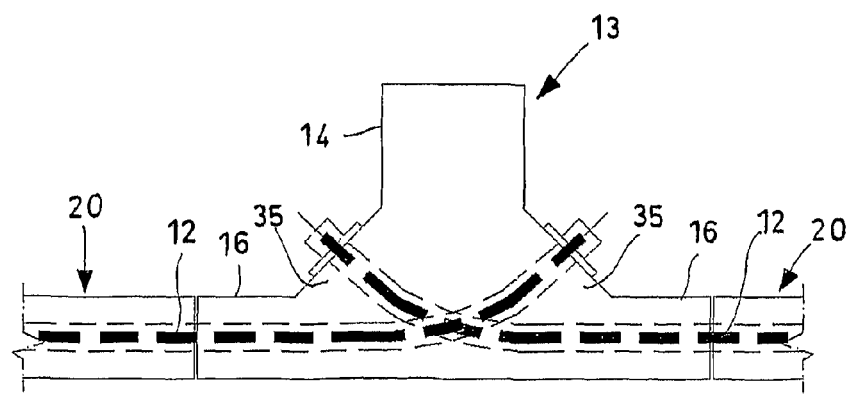

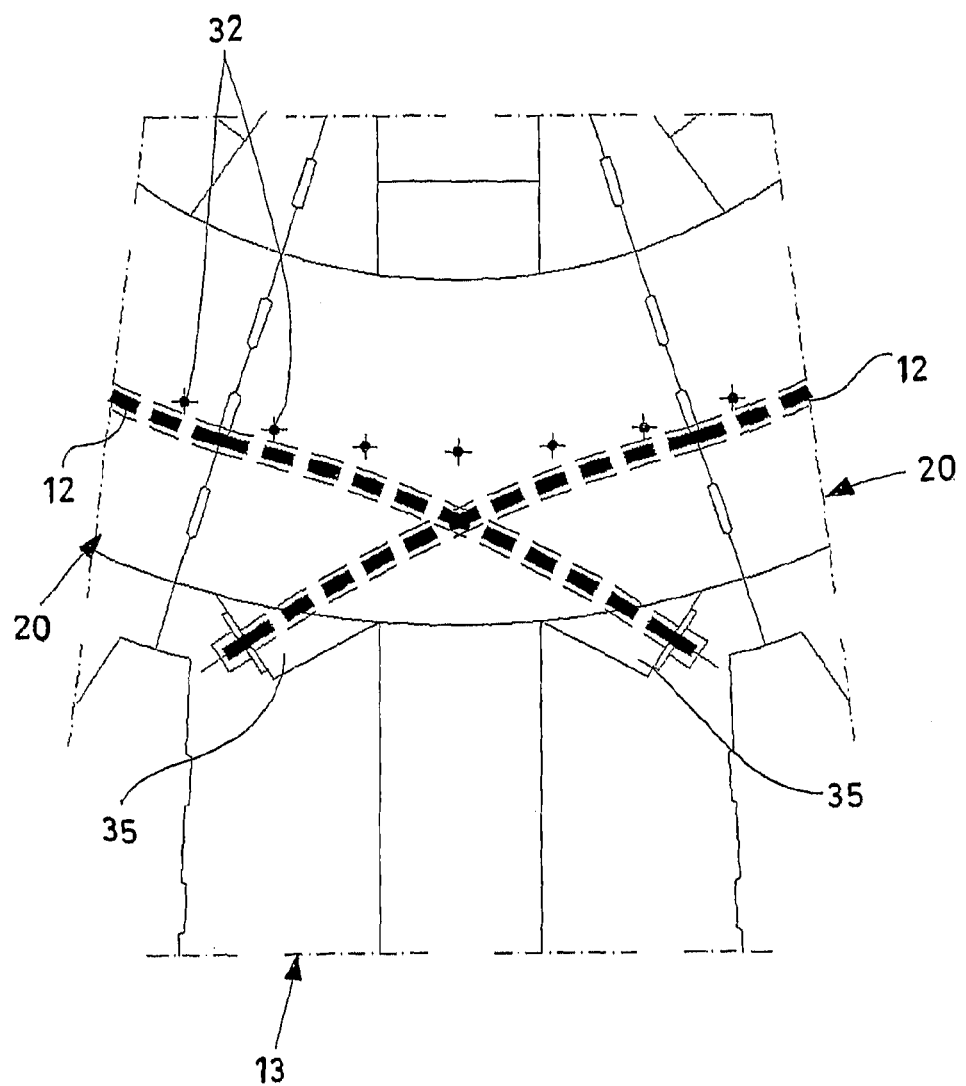

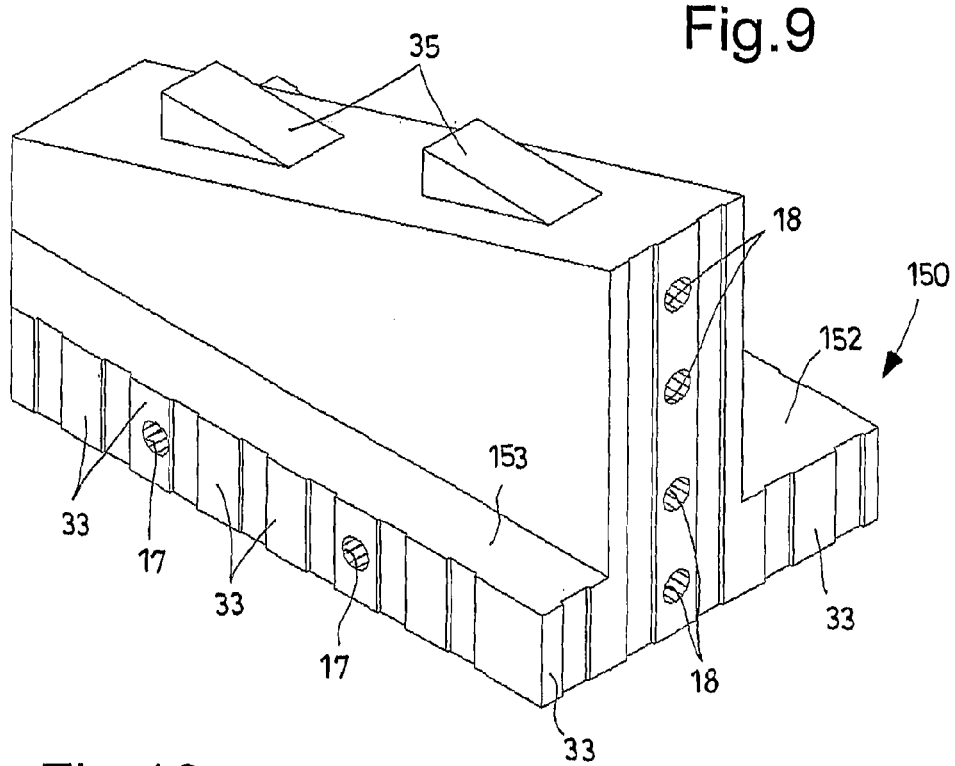
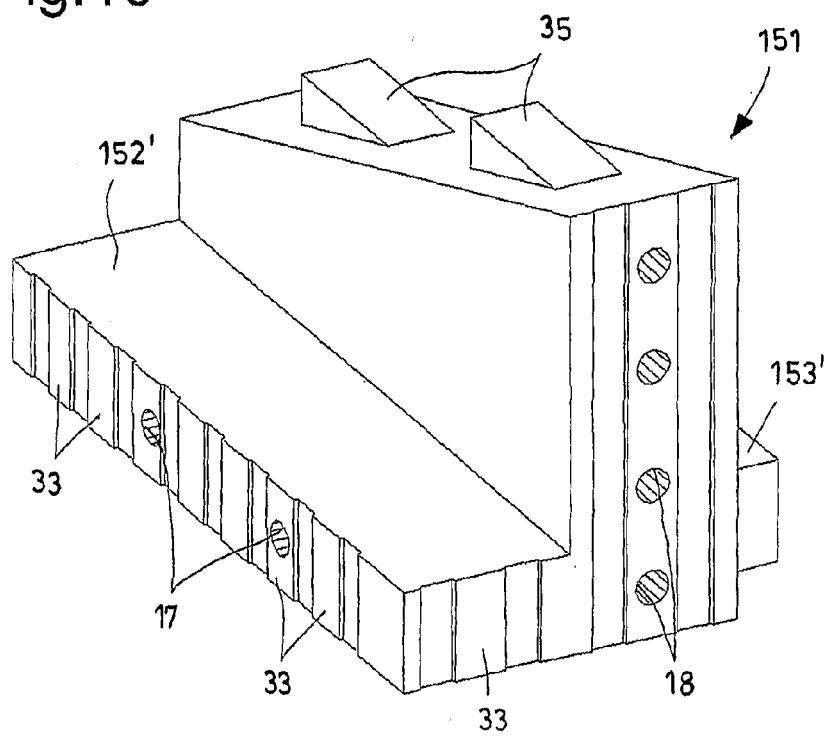

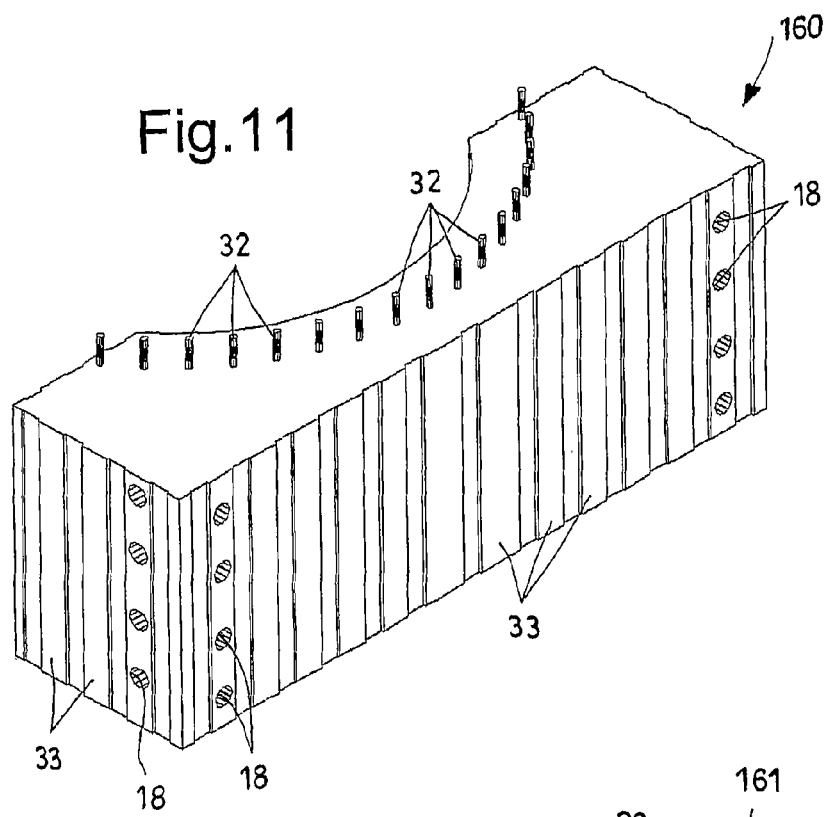
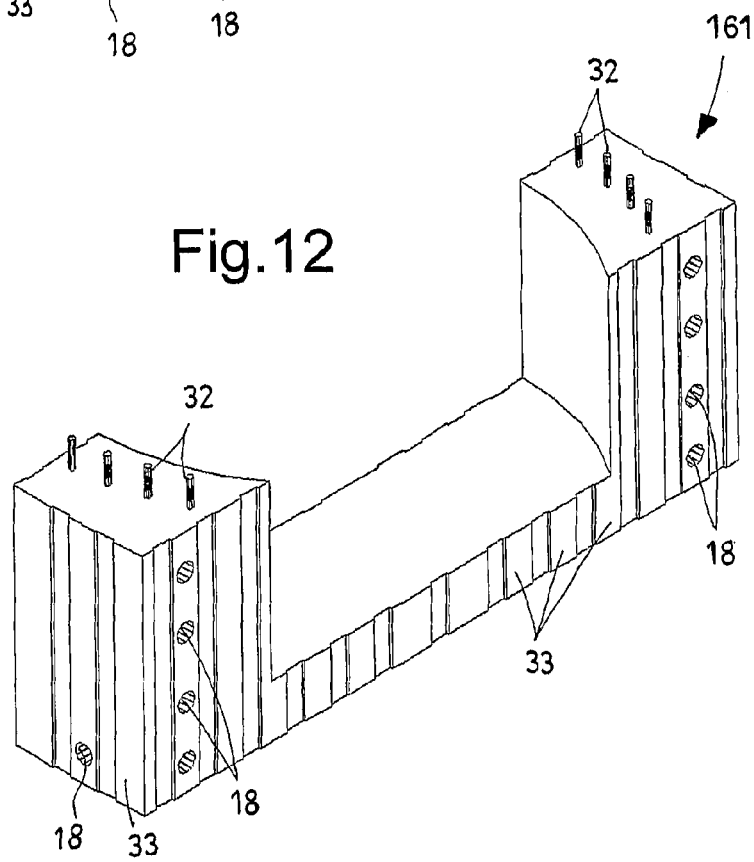

FOUNDATION FOR A WIND TURBINE TOWER

This application is a National Stage entry for PCT application Serial. No. PCT/IB2010/002200 filed on Sep. 2, 2010 and claims the benefit of Italian Application 20099A01559 filed on Sep. 11, 2009.

FIELD OF THE INVENTION

The present invention refers to an improved foundation for a wind turbine tower.

BACKGROUND OF THE INVENTION

In the structure of a wind turbine tower, suitable for the production of electric energy, a foundation capable of always firmly providing a correct and stable positioning of the tower with respect to the surrounding ground, though in presence of all possible stresses during use, is necessarily required.

Generally, these foundations for wind turbine towers require providing an excavation, providing a containment and reinforcement structure according to preset schemes and lastly casting considerable amounts of concrete to obtain imposing reinforced concrete structures. The foundation has a circular or generally polygonal structure, with the aim of optimising the response of the foundations in any direction of the wind. These shapes cause problems related to the formwork and the creation of the plinth suitable for such shape.

In any case, a lot of care and expertise is required to prepare the foundation complex capable of meeting both the law requirements and specific needs arising from the local conditions of use of the wind turbine tower.

Furthermore, it should be clear that such an important structure requires a considerable amount of time for preparation thereof. A further problematic element is that regarding the fact that such towers are not always prepared in positions easily accessible by the machines for transporting the concrete and hence even this gives rise to correlated problems.

The preparation of such foundations cannot be carried out under harsh weather conditions such as intense cold, rain, etc and additionally concrete seasoning times must be complied with before mounting the towers. Lastly, this method of preparation requires the presence of operators and manpower, over long periods of time, on the site where the wind turbine tower is intended to be constructed.

Document WO 2008/036934 describes a modular system of foundations for wind turbine towers in which only part of the foundation elements is prefabricated. Other elements, such as for example the entire base slab, instead require casting considerable volumes of concrete on site.

Documents WO 2005/012651, EP 1 262 614 and JP 2000/283019 describe concrete foundations for wind turbine towers made up of a single monolithic base, usually obtained by means of an on-site casting of concrete.

SUMMARY OF THE INVENTION

An object of the present invention is that of overcoming the abovementioned drawbacks and in particular that of creating an entirely prefabricated foundation for a wind turbine tower meeting the requirements thereof.

Another object of the present invention is that of providing an entirely prefabricated foundation for a wind turbine tower that does not require laying all the construction structures, assembly of the reinforcement steel and casting the required concrete on site.

A further object of the present invention is that of providing an entirely prefabricated foundation for a wind turbine tower which is easy to lay, eliminating or reducing all problems related to the various preparations and respective set-ups at the worksite for preparation thereof to the minimum, simultaneously guaranteeing a better preparation quality.

Still, another object of the present invention is that of providing an entirely prefabricated foundation for a wind turbine tower capable of reducing the preparation times of the entire wind turbine complex.

These and other objects, according to the present invention are attained by providing an entirely prefabricated foundation for a wind turbine tower as outlined in claim 1.

Further characteristics of the foundation are objects of the dependent claims.

BRIEF DESCRIPTION OF THE DRAWINGS

Characteristics and advantages of an entirely prefabricated foundation for a wind turbine tower according to the present invention shall be clearer from the description that follows, by way of non-limiting example, referring to the attached schematic drawings wherein:

FIG. 2b shows a variant embodiment of the prefabricated element of FIG. 2;

FIG. 5b shows a sectional schematic detail of blocks for holding cables in the prefabricated element shown in FIG. 2b;

FIG. 5c shows a schematic detail—in a top plan view—of the blocks for holding the cables of FIG. 2b;

FIGS. 7-12 are side elevational perspective views of various prefabricated elements constituting the foundation according to the invention, in the embodiment shown in FIG. 6.

FIGS. 7-12 are side elevational perspective views of various prefabricated elements constituting the foundation according to the invention, in the embodiment shown in FIG. 6.

DETAILED DESCRIPTION OF EMBODIMENTS OF THE INVENTION

Referring to FIGS. 1-5c, a first embodiment of an entirely prefabricated foundation for a wind turbine tower according to the present invention is shown in its entirety with 11.

The foundation 11 has—in plan view—a circular shape provided with a central accommodation 10 for accommodating and firmly constraining the actual tower (not shown), made of steel or concrete.

According to the invention, the foundation 11 is entirely prefabricated and obtained by approaching in sequence two or more prefabricated structural elements, modular and monolithic, made of reinforced concrete, some possibly pre-compressed, with adherent strands placed during the fabrication of the structural elements themselves. The modular prefabricated structural elements are arranged approached together, shape-coupled, and they are subsequently constrained to each other by a series of post-tension cables 12, so as to make the entire foundation monolithic 11.

Figure 2A:
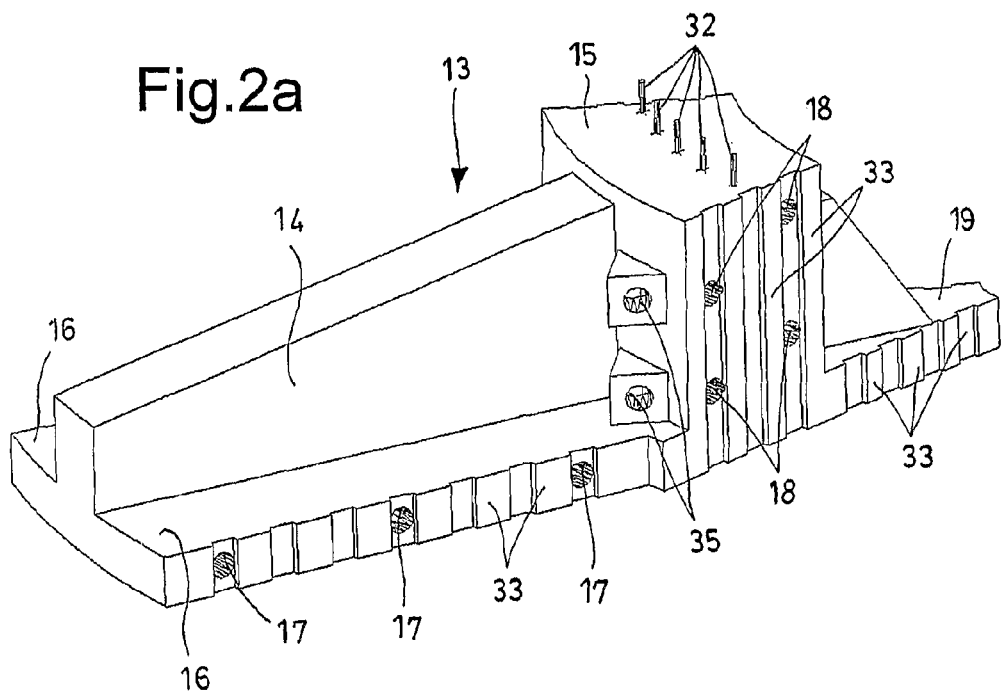
FIG. 2a is a side elevational perspective view of a prefabricated element constituting the foundation according to the invention, according to a first embodiment.
Figure 3:
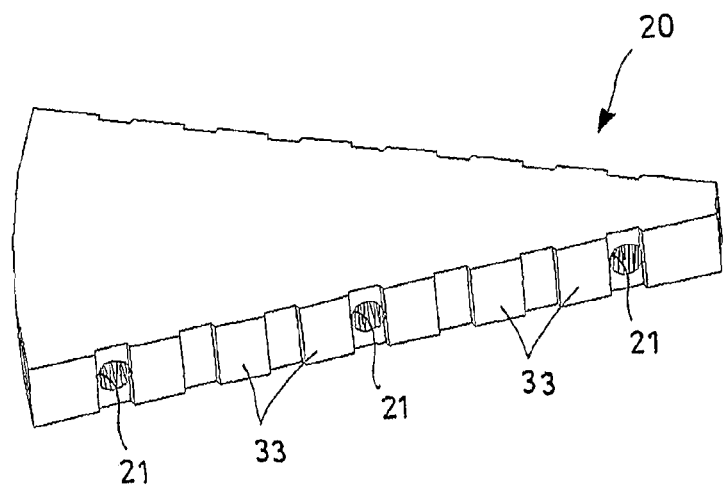
FIG. 3 is a side elevational perspective view of a second prefabricated element constituting the foundation according to the invention, according to a first embodiment.

The example shown in FIGS. 2a and 3 proposes a first structural element, indicated in its entirety with 13, which has radial ribs 14 and pieces 15 of an annular structural element for accommodating the tower (not shown).

The radial ribs 14 widen, on opposite sides of the radial extension thereof, into slab portions 16 in which through-holes 17 for the passage of post-tension cables 12 are provided, arranged in a horizontal plane.

The pieces 15 of each annular element have a trapezium-shaped section—in plan view—with arched bases, obtaining—approached—an annular central body. Further through-holes 18 for the passage of further horizontal post-tension cables 12 are provided in the body of the single piece 15, arranged in a vertical plane. Further slab portions 19, also trapezium-shaped—in plan view—having arched bases, are radially extended from such pieces 15 towards the centre of curvature. As shown in FIGS. 2a and 2b, the piece 15 contains threaded bars 32 which project at the upper part for fixing the actual wind turbine. Each of the two lateral surfaces of the element 13 has an indentation 33 suitable for improving the friction coupling, shape-coupled, with other elements 20 having complementary indentations 33.

Figure 4B:
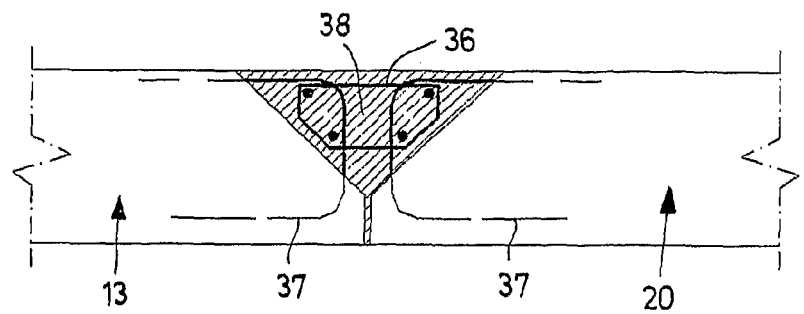
FIG. 4b shows a sectional schematic detail of a coupling between two structural elements of the foundation shown in FIG. 1, according to an alternative connection solution.

A second structural element 20 provides wedge portions of a slab which end up positioned between two consecutive first structural elements 13. Through-holes 21 for the passage of post-tension cables 12, arranged in a horizontal plane are provided even in this second structural element 20, and the side surfaces for contact with other elements 20 have indentations 33 for optimizing the mutual coupling. Alternatively to the presence of the horizontal post-tension cables 12, a coupling between structural elements 13 and 20, without indentations, obtained through connection reinforcement 36, arranged to connect iron elements 37 inside the prefabricated structural elements 13 and 20, and an on-site casting 38 may be provided for. It is obvious that the prefabricated structural elements 13 and 20 must have, on opposite surfaces, flaring elements for holding the reinforcement and the cast 38, as shown in FIG. 4b.

Hence, in the first more general embodiment, the foundation 11 according to the invention provides for at least two different types of structural elements 13 and 20, arranged alternated between each other and approached complementarily, so as to obtain the foundation 11 itself.

After arranging the structural elements 13 and 20 alternatingly to obtain the foundation 11, the cables 12 are positioned, as better clarified hereinafter.

A first series of cables 12 is arranged passing through into the holes 17 and 21, to obtain adjacent circular lines arranged in the slab portions 16 and 20, while a second series of cables 12 is arranged in the holes 18 of the pieces 15, obtaining circular lines overlapped in the central body. The cables 12 are tensioned by means of special blocks 35 suitable to fix the post-tension cables, observable in FIGS. 5a, 5b and 5c.

Figure 5A:
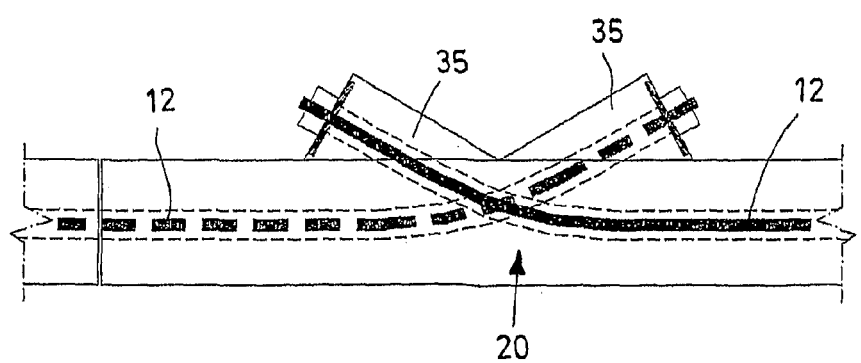
FIG. 5a shows a further sectional schematic detail of blocks for holding cables in the foundation shown in FIG. 1.

The blocks 35 for fixing the cables 12 may be obtained both on the second structural element 20, as shown in FIG. 5a, and on the first structural element 13. FIG. 2a shows a first structural element 13 on which the blocks 35 are obtained at the piece 15 of annular structural element for accommodating the tower. FIGS. 2b, 5b and 5c instead show a first structural element 13 on which the blocks 35 are obtained both at the piece 15 of annular structural element for accommodating the tower, and at the radial ribs 14. According to the variant embodiment of FIGS. 2b, 5b and 5c, the second structural element 20 is without fixing blocks 35.

Figure 1:
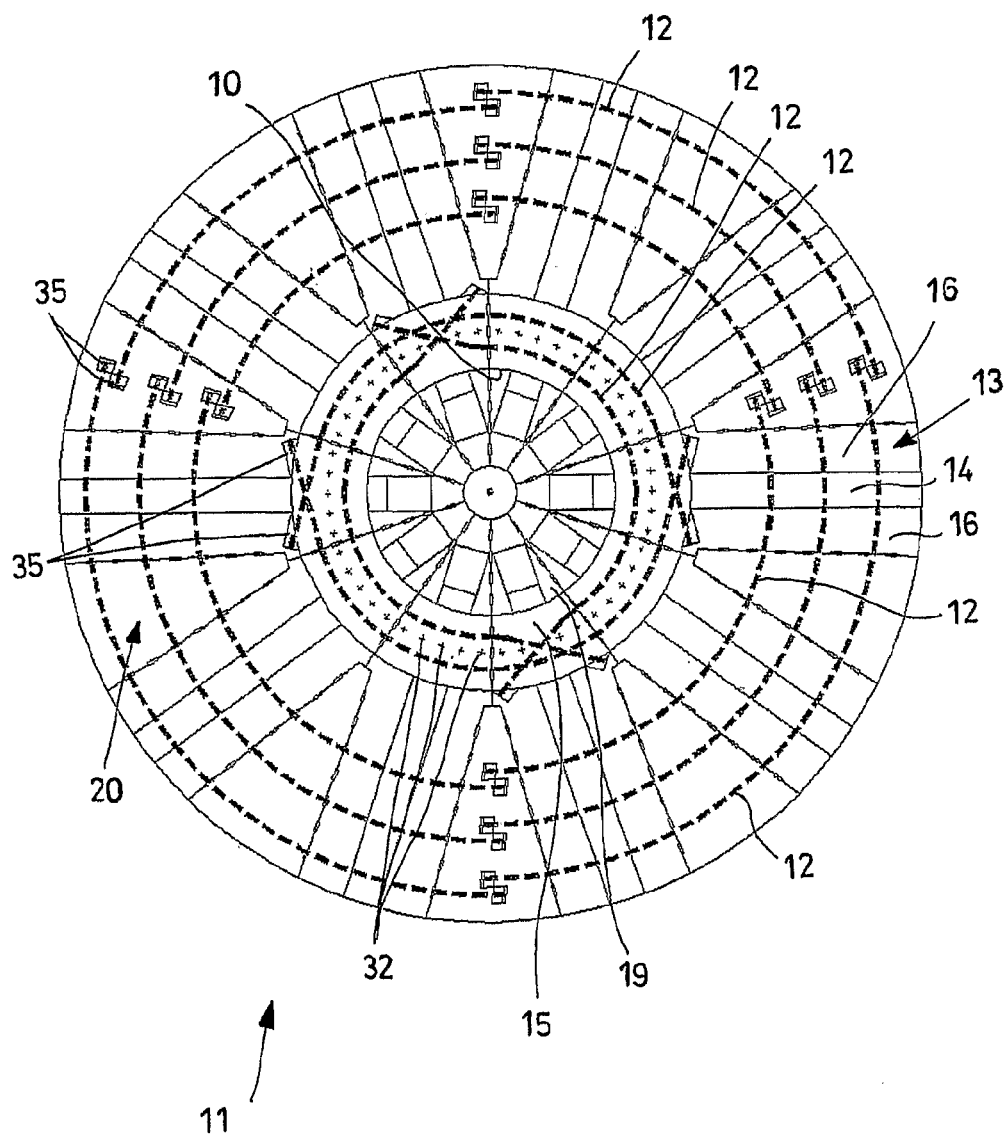
FIG. 1 is a top plan view of an entirely prefabricated foundation for a wind turbine tower according to the present invention.

FIG. 1 very clearly shows the development of the post-tension cables according to circular lines arranged in the slab portions and in the pieces of the circular-shaped central body. It is obvious that such development of the cables 12 may also not be circular.

It should be borne in mind that all the mentioned through-holes are obtained by prearranging—in the prefabricated elements 13 and 20—electrically insulated sheaths in which the post-tension cables 12 to be laid and tensioned on site shall be accommodated.

In an alternative embodiment still according to the present invention, the first structural element 13 may be divided and made up of sub-elements which may be identified in the rib, in the slab portion and in the piece of central body.

Figure 4A:
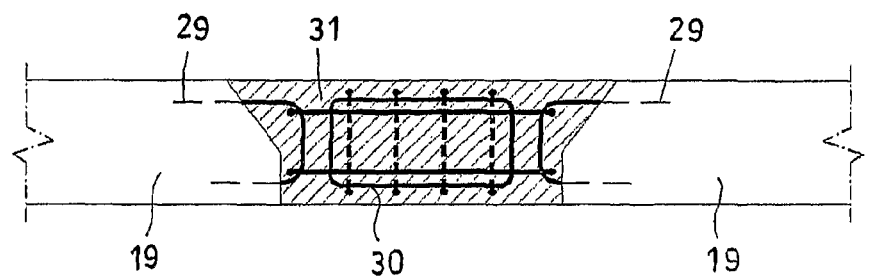
FIG. 4a shows a sectional schematic detail of a central ring of the foundation shown in FIG. 1.

FIG. 4a schematically shows how the completion, in some examples of implementation, may be executed with a metal reinforcement 30 and concrete castings 31 performed on site. In particular the reinforcement 30 is tied to a reinforcement 29 projecting from the slab portions 19 of the first prefabricated structural elements 13.

FIGS. 5a and 5b also show the arrangement of the end portions of the cables 12 or pieces of cables 12 arranged in second structural elements 20 at the special blocks 35 suitable for fixing the post-tension cables 12.

Operatively, the prefabricated foundation according to the present invention is mounted and laid as follows. After preparing and levelling the foundation laying surface, there follows the laying of one of the first structural elements 13 (FIGS. 2a and 2b) of the foundation itself. Thus, one of the second structural elements 20 (FIG. 3) of the foundation is approached to the abovementioned first structural element 13 previously laid. The aforementioned procedure continues, by sequentially and alternatingly approaching a first structural element 13 and a second structural element 20 up to the completion of the entire geometry of the foundation, as shown in FIG. 1.

After approaching all the structural elements 13 and 20 and completing the entire geometry of the foundation, a first series of post-tension cables 12 is inserted into the respective holes 18 of the pieces 15 of each first structural element 13. The post-tension cables 12 are thus tensioned through the blocks 35 (FIGS. 5a, 5b and 5c). Subsequently a second series of post-tension cables 12 is inserted through the holes 17 and 21 respectively made in the slab portions 16 of each first structural element 13 and in each second structural element 20. Even these last post-tension cables 12 are tensioned using the respective blocks 35.

Lastly, all the post-tension cables 12 are recalibrated. Before approaching, each side contact surface between the structural elements 13 and 20 is covered with an epoxy resin, which guarantees the lubrication of the contact surfaces themselves and, after hardening, it allows the transfer of the stresses between the adjacent structural elements 13 and 20. Lastly, cement mortar is injected into the sheaths where the post-tension cables 12 are accommodated. Alternatively, sliding cables (so-called "unbounded") which do not require the injection of cement mortar may be used. The contact coupling between the structural elements 13 and 20, obtained from the pre-compression forces, guarantees the monolithic capacity of the foundation. Such foundation, being entirely prefabricated, may however be entirely dismounted and rearranged on other sites.

It is therefore clear that a foundation according to the present invention is particularly functional, in that it is prefabricated in its structural elements in an extremely simple manner in a factory and it is then installed and assembled at the site of use.

The simple installation of cables between the various structural elements allows providing—on site a stable positioning of the abovementioned prefabricated foundation.

The fact of using these prefabricated structural elements eliminates the need of having expert personnel capable of preparing the complex reinforcements required in the foundations according to the prior art to receive the reinforcements and the concrete castings.

Problems related to stocking considerable amounts of concrete and transport thereof to the site where the wind turbine tower is intended to be constructed are eliminated.

According to the invention, the times for laying the foundation for a wind turbine tower and thus the entire wind turbine complex, are also generally reduced.

FIGS. 6-12 show a second embodiment of the entirely prefabricated foundation entirely prefabricated for a wind turbine tower according to the invention, generally indicated with 111.

The foundation 111 has—in plan view—a polygonal shape provided with a central accommodation 10 for accommodating and firmly constraining the actual tower (not shown), made of steel or concrete.

According to the invention, even this second foundation 111 is obtained by sequentially approaching a plurality of prefabricated structural elements, modular and monolithic, made of reinforced concrete, some possibly pre-compressed, with adherent strands arranged when fabricating the structural elements themselves. Such modular prefabricated structural elements are arranged approached, shape-coupled, and they are subsequently constrained to each other by a series of post-tension cables 12 arranged both in the ribs and in the slabs, so as to make the entire foundation monolithic 111.

The example shown in FIGS. 7-12 proposes several structural elements of the foundation 111 which form the slab portions 140, 141, radial ribs 150, 151 and pieces 160, 161 of a central annular structural element for accommodating the tower (not shown). All these structural elements form, joined together, the foundation 111 of FIG. 6.

The radial ribs 150, 151 (FIGS. 9 and 10) widen on opposite sides of their extension into slab portions 152, 153 and respectively 15240 and 153' in which through-holes 17 for the passage of the post-tension cables 12 are provided, arranged in a horizontal plane. The ribs 150, 151 also bear holes 18 for the passage of further horizontal post-tension cables 12, arranged in a vertical plane. Special blocks 35 for fixing the post-tension cables 12 are provided for at the upper part of the ribs 150, 151.

The slab portions 153 and 153', given that they are at least partly joined together at corners thereof, have—in such position—complementary shapes which "fit", thus leading to a, stable mutual positioning.

Just like in the previous embodiment, the structural elements 140, 141, 150, 151, 160, 161 may provide for, on opposite side coupling surfaces, indentations 33 adapted to improve the coupling, shape-coupled, with other elements having complementary indentations 33.

The pieces 160 and 161 of the central annular structural element for accommodating the tower also contain threaded bars 32 which project at the upper part for fixing the actual wind turbine.

After arranging all the structural elements of this further embodiment to obtain the foundation 111, provided for is the positioning of the cables 12, at least required in the central annular structural elements 160, 161 for accommodating the tower to identify the central accommodation.

Figure 6:
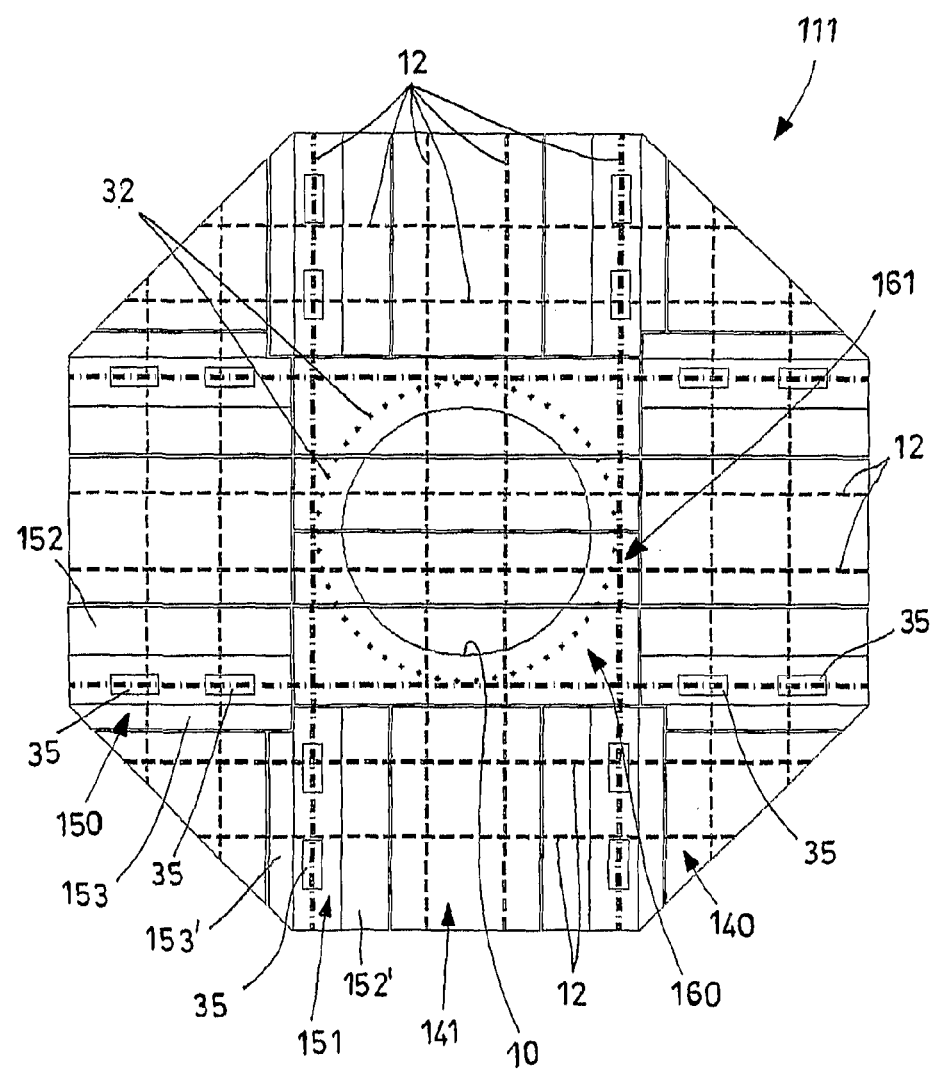
FIG. 6 is a top plan view of a further embodiment of an entirely prefabricated foundation for a wind turbine tower according to the present invention.
Figure 7:
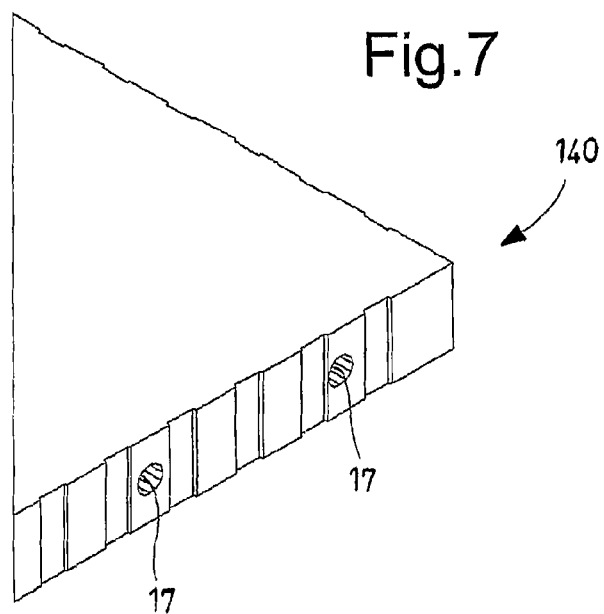
Figure 8:
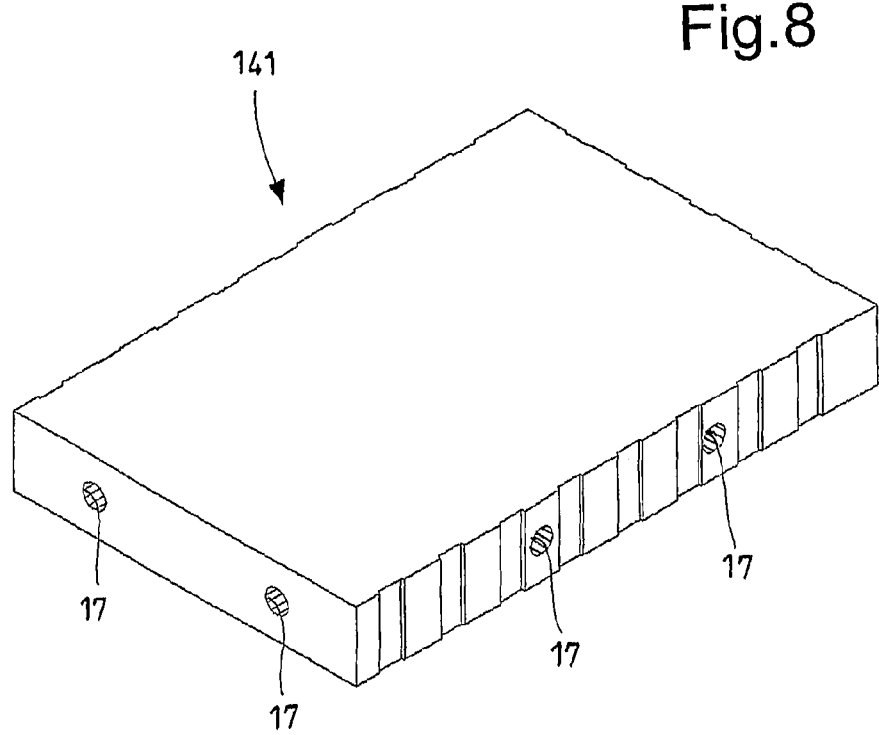

Alternatively, the cables 12 are also arranged in the structural elements 140, 141, 150, 151, as shown in FIG. 6. Also in this case, the cables 12 are tensioned by the special blocks 35 suitable to fix post-tension cables.

The characteristics and advantages of the improved foundation subject of the present invention are clear from the description above.

Lastly, it is clear that the foundation thus conceived is susceptible to various modifications and variants, all falling within the scope of the invention; furthermore, all the details may be replaced by technically equivalent elements. In practice, the materials used, as well as the dimensions, may vary according to the technical requirements.

The invention claimed is:

1. A foundation (11; 111) for a wind turbine tower configured to support and firmly constrain the wind turbine tower, made of steel or concrete, the foundation comprising:
 a plurality of prefabricated structural elements (13, 20; 140, 141, 150, 151, 160, 161), wherein:
 each of said prefabricated structural elements (13, 20; 140, 141, 150, 151, 160, 161) is modular, made of reinforced concrete, and is provided with a horizontal portion and indentations on lateral surfaces thereof, the structural elements are coupled together horizontally with the lateral surfaces of said prefabricated structural elements mating with one another,
 each of said horizontal portions of the prefabricated structural elements (13, 20; 140, 141, 150, 151, 160, 161) is provided with horizontal through-holes (17, 18, 21) inside which are arranged a series of post-tension cables (12) so as to fixedly join the elements of said foundation, and
 at least two (13, 150, 151) of said prefabricated structural elements (13, 20; 140, 141, 150, 151, 160, 161) are provided with longitudinal ribs (14) extending vertically from the horizontal portions of said at least two (13, 150, 151) prefabricated structural elements, said longitudinal ribs being monolithic with said horizontal portions; and
 a plurality of fixing blocks (35) disposed against the rib of the at least two prefabricated structural elements, said fixing blocks locking ends of said post-tension cables into position.

2. The foundation according to claim 1, wherein said plurality of prefabricated structural elements comprise a plurality of first structural elements (13) each having the horizontal portion with one of the longitudinal ribs (14), and an annular structural element adjacent the rib for receiving the tower onto the foundation, said one of the longitudinal ribs being monolithic with and longitudinally attached to said annular structural element.

3. The foundation according to claim 2, wherein the plurality of prefabricated structural elements further comprise a plurality of second structural elements (20) each shaped as a wedge portion of a slab, said second structural elements being laterally joined to at least one of said prefabricated structural elements.

4. The foundation according to claim 3, wherein said first structural elements (13) and said second structural elements

(20) each have said through-holes (17, 18, 21) that are adjoined to receive said post-tension cables (12).

5. The foundation according to claim 3, wherein said first structural elements (13) and said second structural elements (20) each have complementary lateral surfaces and are arranged such that one of the first elements is adjacent one of the second elements.

6. The foundation according to claim 2, wherein said first structural element further comprises a slab member (19), said annular structural element being disposed longitudinally between and integrally adjoined to said slab member (19) and said one of the longitudinal fibs.

7. The foundation according to claim 1, wherein said prefabricated structural elements comprise at least slab portions (140, 141), the longitudinal ribs (150, 151) and portions (160, 161) of a central annular structural element for receiving the tower.

8. The foundation according to claim 7, wherein said slab portions (140, 141), said longitudinal ribs (150, 151), and said portions (160, 161) of said central annular structural element have said through-holes (17, 18, 21) that receive said post-tension cables (12).

9. The foundation according to claim 1, wherein at least one of said prefabricated structural elements (13, 160, 161) contain threaded bars (32) which project upwardly from an upper part thereof for fixing the wind turbine.

10. The foundation according to claim 1, wherein said indentations are on opposite surfaces of the elements, said indentations being adapted to provide friction coupling.

11. A method for mounting and implementing a foundation (11; 111) for a wind turbine tower, the method comprising the following steps:

preparing and levelling a surface for laying the foundation (11; 111) of claim 1;

providing the plurality of prefabricated structural elements (13, 20; 140, 141, 150, 151, 160, 161);

laying said structural elements and inserting, in the respective through-holes (17, 18, 21) of said structural elements (13, 20; 140, 141, 150, 151, 160, 161), and tensioning, through the fixing blocks (35), at least one of said post-tension cables (12).

12. The method according to claim 11, wherein said inserting and tensioning step comprises, a first sub-step in which a first series of said post-tension cables (12) is inserted, in respective through-holes (18) made in at least one of the structural elements (13), and tensioned, and a second sub-step in which a second series of said post-tension cables (12) is inserted, through the holes (17, 21) made respectively in the horizontal portions of another one of the structural elements (13 20), and tensioned.

13. The method according to claim 12, further comprising a further final step of recalibrating all post-tension cables (12).

14. The method according to claim 11, further comprising, before the laying step, a step in which each lateral surface between the structural elements (13, 20; 140, 141, 150, 151, 161, 160 is covered with an epoxy resin, which provides for lubrication of the lateral surfaces and, once hardened, allows a transfer of stresses between said structural elements (13, 20; 140, 141, 150, 151, 161, 160).

\* \* \* \* \*

UNITED STATES PATENT AND TRADEMARK OFFICE
CERTIFICATE OF CORRECTION

| | | |
|---|---|---|
| PATENT NO. | : 8,695,297 B2 | Page 1 of 1 |
| APPLICATION NO. | : 13/394121 | |
| DATED | : April 15, 2014 | |
| INVENTOR(S) | : Stefano Knisel | |

It is certified that error appears in the above-identified patent and that said Letters Patent is hereby corrected as shown below:

Title Page, Assignee Item (73): Replace --Stefano Kniesel-- with --Stefano Knisel--

Signed and Sealed this
Twenty-fourth Day of June, 2014

Michelle K. Lee
*Deputy Director of the United States Patent and Trademark Office*